(12) United States Patent
Xu et al.

(10) Patent No.: US 12,418,073 B2
(45) Date of Patent: Sep. 16, 2025

(54) BATTERY AND BATTERY APPARATUS

(71) Applicant: CALB Co., Ltd., Suzhou (CN)

(72) Inventors: Jiuling Xu, Changzhou (CN); Jiyu Bi, Changzhou (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 651 days.

(21) Appl. No.: 17/834,949

(22) Filed: Jun. 8, 2022

(65) Prior Publication Data

US 2023/0327273 A1    Oct. 12, 2023

(30) Foreign Application Priority Data

Apr. 7, 2022  (CN) .......................... 202210358765.7

(51) Int. Cl.
| | |
|---|---|
| *H01M 50/325* | (2021.01) |
| *H01M 10/052* | (2010.01) |
| *H01M 50/186* | (2021.01) |
| *H01M 50/547* | (2021.01) |
| *H01M 50/609* | (2021.01) |

(52) U.S. Cl.
CPC ....... *H01M 50/325* (2021.01); *H01M 10/052* (2013.01); *H01M 50/186* (2021.01); *H01M 50/547* (2021.01); *H01M 50/609* (2021.01); *H01M 2200/20* (2013.01)

(58) Field of Classification Search
CPC .................................................. H01M 50/325
See application file for complete search history.

(56) References Cited

U.S. PATENT DOCUMENTS

| | | | | |
|---|---|---|---|---|
| 2020/0203699 | A1* | 6/2020 | Li | ........................ H01M 50/148 |
| 2022/0373602 | A1* | 11/2022 | Kitagawa | .............. H01M 10/48 |

FOREIGN PATENT DOCUMENTS

| | | |
|---|---|---|
| CN | 206564278 | 10/2017 |
| CN | 206564278 U | * 10/2017 |
| CN | 208507798 | 2/2019 |
| CN | 211578856 | 9/2020 |

(Continued)

OTHER PUBLICATIONS

"Search Report of Europe Counterpart Application", issued on Nov. 25, 2022, p. 1-p. 8.

(Continued)

*Primary Examiner* — Barbara L Gilliam
*Assistant Examiner* — Jordan E Berresford
(74) *Attorney, Agent, or Firm* — JCIP GLOBAL INC.

(57) ABSTRACT

A battery and a battery apparatus are provided. The battery includes a cover plate, an explosion-proof valve arranged on the cover plate, and a protective patch arranged on an outer side of the cover plate. A sealed chamber is formed between the explosion-proof valve and the protective patch, and a notch penetrating through the protective patch is arranged on the protective patch in a thickness direction to form at least one cantilever portion. When a predetermined pressure is applied, the sealed chamber communicates with an outside through the cantilever portion that is opened. The cantilever portion has an area of a $mm^2$. The protective patch has a thickness of b mm, where $0.5\ mm \leq a/b \leq 20\ mm$ and $0.01\ mm \leq b \leq 1.2\ mm$, and the protective patch has a wetting tension of c, where $20\ N/m \leq c \leq 70\ N/m$.

18 Claims, 11 Drawing Sheets

(56) References Cited

FOREIGN PATENT DOCUMENTS

| CN | 112072045 | | | 12/2020 | | |
|----|-----------|---|---|---------|---|---|
| CN | 112610738 | | | 4/2021 | | |
| CN | 112787007 | A | * | 5/2021 | ........ | H01M 10/4228 |
| CN | 113161670 | A | * | 7/2021 | .......... | H01M 10/425 |
| CN | 114050361 | | | 2/2022 | | |

OTHER PUBLICATIONS

"Search Report of Europe Related Application, Application No. 22177152.0", issued on Sep. 15, 2023, p. 1-p. 6.
"Office Action of Related Application, U.S. Appl. No. 17/834,901", issued on Jan. 7, 2025, p. 1-p. 35.
"Office Action of Europe Related Application, Application No. 22177152.0", issued on Jan. 31, 2025, p. 1-p. 5.
"Office Action of U.S. Related Application, U.S. Appl. No. 17/834,901", issued on May 22, 2025, p. 1-p. 35.

* cited by examiner

BATTERY AND BATTERY APPARATUS

CROSS-REFERENCE TO RELATED APPLICATION

This application claims the priority benefits of China application serial no. 202210358765.7, filed on Apr. 7, 2022. The entirety of the above-mentioned patent application is hereby incorporated by reference herein and made a part of this specification.

BACKGROUND

Technical Field

The disclosure relates to the technical field of batteries, and in particular, relates to a battery and a battery apparatus.

Description of Related Art

In the related art, the explosion-proof valve is generally fixed on the edge of the explosion-proof hole by a sheet-shaped explosion-proof membrane. When the internal pressure of the battery is excessively large, the explosion-proof membrane is separated from the explosion-proof hole to achieve explosion-proof effect.

However, since the explosion-proof membrane is exposed, damage problems may occur after prolonged use.

SUMMARY

The disclosure provides a battery and a battery apparatus.

According to the first aspect of the disclosure, a battery is provided, and the battery includes a cover plate, an explosion-proof valve, and a protective patch. An explosion-proof hole is arranged on the cover plate. The explosion-proof valve is arranged on the cover plate to shield the explosion-proof hole. The protective patch is located on an outer side of the cover plate and shields the explosion-proof hole. A sealed chamber is formed between the explosion-proof valve and the protective patch, and a notch penetrating through the protective patch is arranged on the protective patch in a thickness direction to form at least one cantilever portion, and when a predetermined pressure is applied, the sealed chamber may communicate with an outside through the cantilever portion that is opened. The cantilever portion includes a first end point and a second end point. At least a portion of the notch continues from the first end point to the second end point, and the at least a portion of the notch is not in a straight line. The cantilever portion has an area of a $mm^2$, and the area of the cantilever portion is the area jointly enclosed by a connecting line between the first end point and the second end point and the notch between the first end point and the second end point. The protective patch has a thickness of b mm, where $0.5 \leq a/b \leq 20$ mm and $0.01 \leq b \leq 1.2$ mm, the protective patch has a wetting tension of c, where $20 \text{ N/m} \leq c \leq 70 \text{ N/m}$, and a wetting tension test method applied to the protective patch is: GB/T 14216-1993.

According to the second aspect of the disclosure, the disclosure further provides a battery apparatus including the abovementioned battery.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
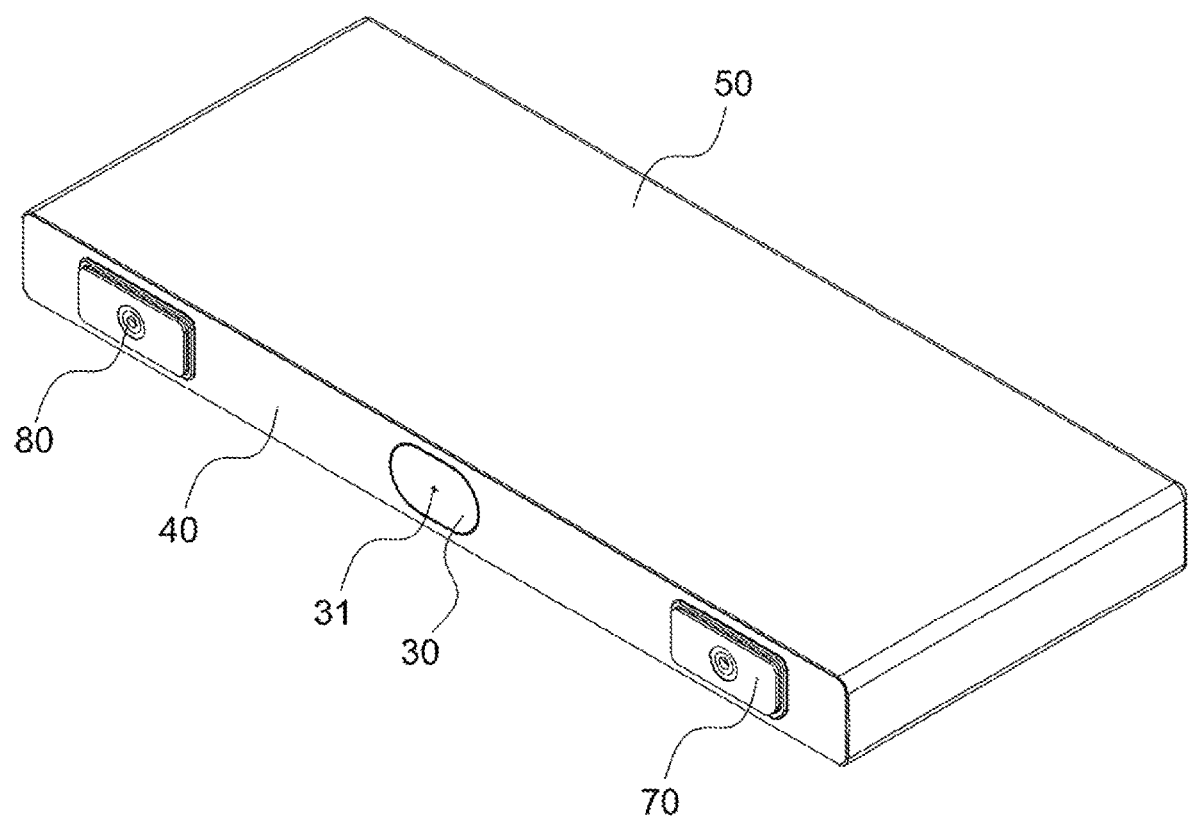
FIG. 1 is a schematic view of a structure of a battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the disclosure provides a battery. With reference to FIG. 1 to FIG. 12, the battery includes a cover plate 10 provided with an explosion-proof hole 11, an explosion-proof valve 20 arranged on the cover plate 10 to shield the explosion-proof hole 11, and a protective patch 30 located on an outer side of the cover plate 10 and shielding the explosion-proof hole 11. A sealed chamber 111 is formed between the explosion-proof valve and the protective patch 30, and a notch 31 penetrating through the protective patch 30 is arranged on the protective patch 30 in a thickness direction to form at least one cantilever portion 33. When a predetermined pressure is applied, the sealed chamber 111 may communicate with an outside through the cantilever portion 33 that is opened. The cantilever portion 33 includes a first end point 331 and a second end point 332. At least a portion of the notch 31 continues from the first end point 331 to the second end point 332, and the at least a portion of the notch 31 is not in a straight line. The cantilever portion 33 has an area of a mm², the area of the cantilever portion 33 is the area jointly enclosed by a connecting line between the first end point 331 and the second end point 332 as well as the notch 31 between the first end point 331 and the second end point 332. The protective patch 30 has a thickness of b mm, where $0.5 \text{ mm} \leq a/b \leq 20 \text{ mm}$ and $0.01 \text{ mm} \leq b \leq 1.2 \text{ mm}$. The protective patch 30 has a wetting tension of c, where $20 \text{ N/m} \leq c \leq 70 \text{ N/m}$, and a wetting tension test method applied to the protective patch 30 is: GB/T 14216-1993.

The battery provided by an embodiment of the disclosure includes the cover plate 10, the explosion-proof valve 20, and the protective patch 30. The explosion-proof hole 11 is arranged on the cover plate 10, and the explosion-proof valve 20 is arranged on the cover plate and shields the explosion-proof hole 11. By arranging the protective patch 30 on the outer side of the cover plate 10 and shielding the explosion-proof hole 11, the protective patch 30 can safeguard the explosion-proof valve 20 to protect the explosion-proof valve 20, and the life and safety of the explosion-proof valve 20 is thereby improved. The notch 31 is arranged on the protective patch 30. In this way, the notch 31 is in a closed state under normal conditions, that is, the chamber 111 is a sealed chamber. When the battery is tested for airtightness, the cantilever portion 33 formed by the notch 31 can be in an opened state when a predetermined pressure is applied, such that the chamber 111 is an unsealed chamber. Through the arrangement of the notch 31, the explosion-proof valve 20 is effectively protected under normal use. The notch 31 may further be used for the airtightness testing of the battery to accordingly improve the performance of the battery.

It is noted that. the protective patch 30 is located on the outer side of the cover plate 10 and the protective patch 30 may be arranged on the cover plate 10, or the protective patch 30 may be arranged on the explosion-proof valve 20, so that the protective patch 30 is located on the outer side of the cover plate 10 to safeguard the explosion-proof valve 20. In some embodiments, a reinforcement ring may be arranged on the cover plate 10, and the protective patch 30 may be arranged on the reinforcement ring. Herein, a hole wall of the explosion-proof hole 11, the explosion-proof valve 20, and the protective patch 30 may together enclose the chamber 111. In some embodiments, a reinforcement ring may be arranged on the explosion-proof valve 20, and the protective patch 30 may be arranged on the reinforcement ring. Herein, the explosion-proof valve 20 and the protective patch 30 may together form the chamber 111.

Figure 4:
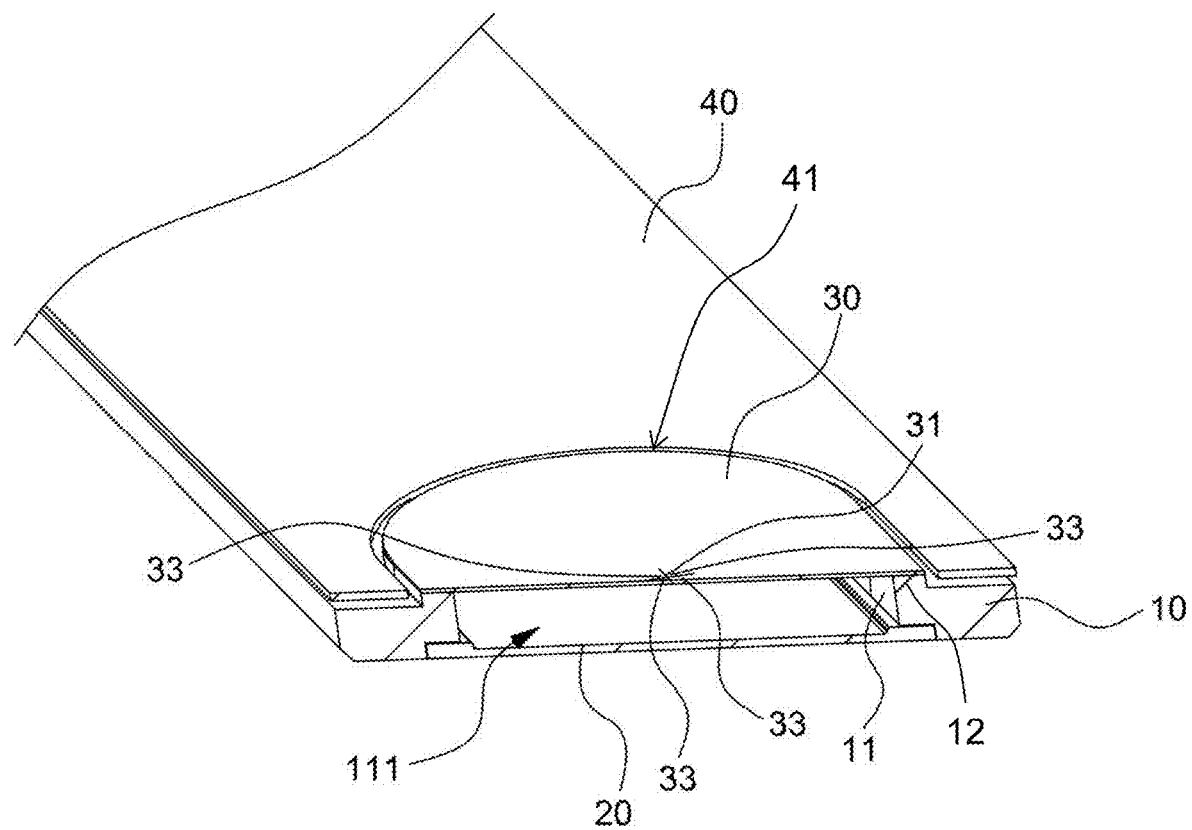
FIG. 4 is a schematic cross-sectional view of a portion of the battery according to an exemplary embodiment.

As shown in FIG. 4, the protective patch 30 is arranged on an outer surface of the cover plate 10 and shields the explosion-proof hole 11, and the hole wall of the explosion-proof hole 11, the explosion-proof valve 20, and the protective patch 30 together form the chamber 111. The protective patch 30 may thereby be arranged opposite to the explosion-proof valve 20, so that the protective patch 30 can reliably protect the explosion-proof valve 20. The protective patch 30 may prevent a foreign object from entering the explosion-proof valve 20 or prevent a sharp object from piercing the explosion-proof valve 20. At the same time, the protective patch may also achieve dustproof and waterproof and thereby improving the safety performance of the explosion-proof valve 20.

Figure 11:
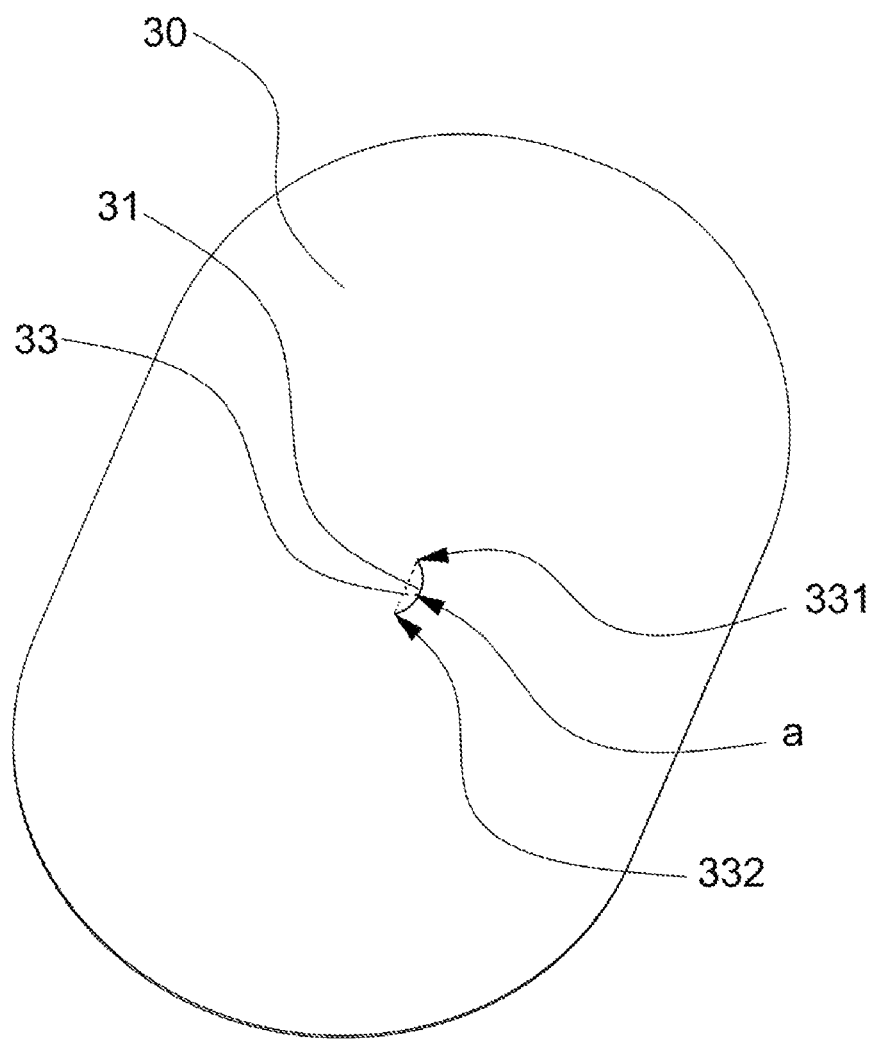
FIG. 11 is a schematic view of the protective patch of the battery according to a sixth exemplary embodiment.

As shown in FIG. 11, the cantilever portion 33 includes the first end point 331 and the second end point 332. At least a portion of the notch 31 continues from the first end point 331 to the second end point 332, at least a portion of the notch 31 is not in a straight line, and in this way, the cantilever portion 33 forms a foldable structure. As shown in FIG. 11, the notch 31 may be in a curve. Alternatively, the notch 31 may include two intersecting straight lines.

The area a of the cantilever portion 33 is the area jointly enclosed by the connecting line between the first end point 331 and the second end point 332 together with the notch 31 between the first end point 331 and the second end point 332. As shown in FIG. 11, the connecting line between the first end point 331 and the second end point 332 is a dotted line shown in the figure, the notch 31 between the first end point 331 and the second end point 332 may be a curve, and the area enclosed between the dotted line and the curve is the area a of the cantilever portion 33.

Figure 12:
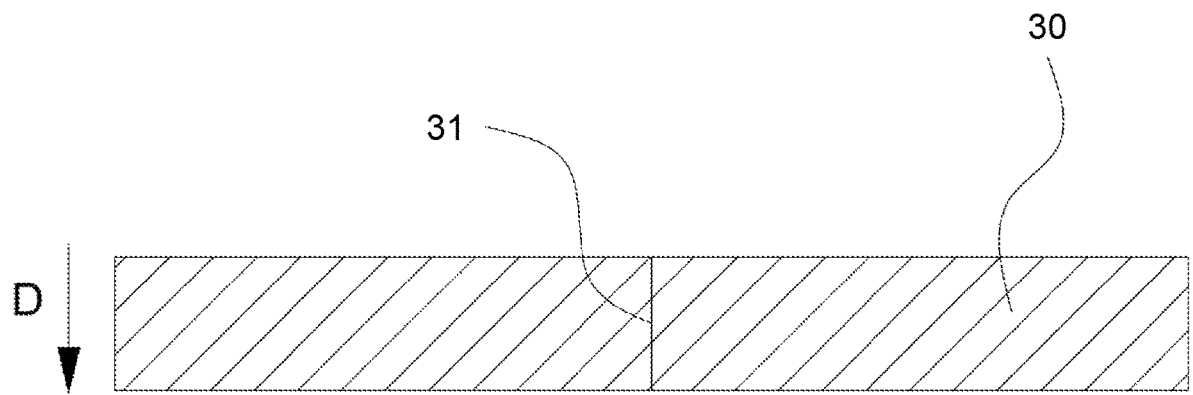
FIG. 12 is a schematic cross-sectional view of the protective patch of the battery according to an exemplary embodiment.

As shown in FIG. 12, the notch 31 penetrating through the protective patch 30 in a longitudinal direction is provided in a thickness direction D. The notch 31 may be considered as a cut in the middle of the protective patch 30, that is, no material removal is performed. Therefore, the notch 31 in this embodiment is different from a slit cut by material removal. Due to the notch 31 provided on the protective patch 30, the protective patch 30 is still an integral structure in a normal state. The notch 31 does not allow the chamber 111 to communicate with the outside space, and therefore, substances such as external gas or dust may not enter the chamber 111 through the notch 31, so that the protective patch 30 can reliably protect the explosion-proof valve 20. When the battery is tested for airtightness, an evacuation device may be connected to the battery, so that when the vacuum degree reaches a specific value, the protective patch 30 is deformed by the notch 31, that is, the cantilever portion 33 may be in the opened state when a predetermined pressure is applied, and the notch 31 accordingly releases the chamber 111. That is, the chamber 111 may communicate with the evacuation device, and the testing of the airtightness of the battery may thus be implemented. As shown in FIG. 6 to FIG. 11, in the thickness direction of the protective patch 30, the notch 31 penetrating the protective patch 30 is provided. As such, at least one cantilever portion 33 is formed on the protective patch 30, that is, the notch 31 may include at least two straight notch segments, or at least one curved notch segment. In this way, the cantilever portion 33 forms a foldable structure, for example, the cantilever portion 33 may be a triangular structure. Herein, the cantilever portion 33 may be folded along one side, so that the cantilever portion 33 may be in the open state under the action of a predetermined pressure, and that the notch 31 releases the chamber 111. That is, the chamber 111 may communicate with the evacuation device, and the testing of the airtightness of the battery may thus be implemented.

The notch 31 in this embodiment allows the chamber 111 to communicate with the outside, so as to test the sealing performance of the cover plate 10 and the shell 50 and to determine whether the airtightness of the battery is good. The notch 31 penetrating through the protective patch 30 is arranged on the protective patch 30 in the thickness direction to form at least one cantilever portion 33. When a plurality of cantilever portions 33 are provided, the area of each cantilever portion 33 is a $mm^2$, and the thickness b of the protective patch 30 is in the range of 0.01 mm to 1.2 mm and satisfies 0.5 mm≤a/b≤20 mm. The area of the cantilever portion 33 may be considered as the area enclosed by the notch segments forming each cantilever portion 33 and the connecting line between the two points of the notch segments. For instance, one cantilever portion 33 may include two intersecting notch segments, such that the two intersecting notch segments form a triangular cantilever portion 33, and the area of the cantilever portion 33 is the area of the triangle herein. Alternatively, one cantilever portion 33 may include a semicircle, that is, a semicircular cantilever portion 33 is formed, and the area of the cantilever portion 33 is the area of the semicircle herein. For instance, in the structure shown in FIG. 11, the notch 31 is a curve, and the area of the cantilever portion 33 is a as shown in the figure.

If the thickness of the protective patch 30 is excessively large, it may be difficult for the cantilever portion 33 of the notch 31 to be opened during the airtightness testing process and the testing accuracy may be affected. But if the thickness of the protective patch 30 is excessively small, the protective patch 30 may be in an open state in a natural state, and foreign objects such as electrolyte, water, metal swarf, dust, etc. may easily enter the inside of the protective patch 30, causing a battery safety risk.

Further, if the ratio of the area of the cantilever portion 33 to the thickness of the protective patch 30 is excessively small, it may be difficult for the cantilever portion 33 of the notch 31 to open under a specific pressure, and the normal explosion of the explosion-proof valve 20 may be affected and accuracy of the airtightness testing of the battery may thus be poor. If the ratio of the area of the cantilever portion 33 to the thickness of the protective patch 30 is excessively large, the protective patch 30 on both sides of the notch 31 cannot support each other, and the cantilever portion 33 of the notch 31 is easy to open in a natural state. Foreign objects such as electrolyte, water, metal swarf, etc. may easily enter the inside of the protective patch 30, causing a battery safety risk and resulting in low structural strength.

If the wetting tension of the protective patch 30 is excessively large, it may be difficult for the notch 31 of the protective patch 30 to open under a specific pressure, and the normal explosion of the explosion-proof valve 20 may thus be affected, and simultaneously, accuracy of the airtightness testing of the battery may be poor. If the wetting tension of the protective patch 30 is excessively small, the electrolyte may easily enter the protective patch 30, causing battery safety risks.

In this embodiment, the protective patch 30 forms at least one cantilever portion 33, the area of each cantilever portion 33 is a $mm^2$, the thickness b of the protective patch 30 is in the range of 0.01 mm to 1.2 mm and satisfies 0.5 mm≤a/b≤20 mm, and the wetting tension of the protective patch 30 is c, where 20 N/m≤c≤70 N/m. Therefore, it can be ensured that the notch 31 is in a closed state in a normal state, that is, it is ensured that the notch 31 can reliably seal the chamber 111 under normal conditions. The protective patch 30 on both sides of the notch 31 can support each other, such that the protective patch 30 is prevented from sagging, foreign objects are prevented from entering the inside of the explosion-proof valve 20, and the safety performance of the battery is thus improved. Moreover, during the airtightness testing process, the notch 31 may be opened smoothly. That is, the cantilever portion 33 formed by the notch 31 may open under the predetermined pressure to test the airtightness battery, and the test efficiency and accuracy of the airtightness testing are improved. Furthermore, the opening of the protective patch 30 may not excessively deform and may not affect the normal use of the protective patch 30 for a long time, and the service life of the protective patch 30 is thereby improved.

The wetting tension test method applied to the protective patch 30 is: GB/T 14216-1993, such that the wetting tension of the protective patch 30 may be obtained as c. The wetting tension c of the protective patch 30 satisfies 20 N/m≤c≤70 N/m. In this way, the protective patch 30 may be made to have reliable strength to ensure that the notch 31 may reliably seal the chamber 111 under normal conditions. The protective patch 30 is prevented from being opened in a natural state, causing foreign objects such as electrolyte, water, and dust to enter the inside of the explosion-proof valve 20. Further, the notch 31 may open under a predetermined pressure, so as to be used for testing the airtightness of the battery.

The wetting tension test method GB/T 14216-1993 of the protective patch 30 may include the following.
1. Principle: A series of test mixed solutions with gradually increasing surface tension are applied to the surface of the protective patch 30 until the surface of the protective patch 30 is wetted. The wetting tension of this mixed solution is regarded as the wetting tension of the protective patch 30.
2. Regarding utensils: A flat plate, a wooden or glass rod or brush with a cotton tip, and a brown glass drip bottle may be used.
3. Regarding the test mixed solutions: reagent-grade ethylene glycol monoethyl ether, formamide, methanol, and distilled water are prepared into test mixed solutions of different wetting tensions in proportion, and a very small amount of Victoria pure blue (concentration below 0.03%) is added. Each test mixed solution is stored in a clean amber glass drip bottle (if stored well, the mixed solution may change little over time). With regular use, the mixed solutions are required to be re-prepared.
4. Regarding the test samples: the test samples are uniformly cut across the entire width of the film along the transverse direction of the film and sheet. Regardless of whether the film or sheet is in the form of a roll or a laminate, the outer layers shall be discarded when sampling, and the surface to be tested shall not be in contact with any other substances. The sample size is generally 10 cm×10 cm.
5. Test Steps
   (1) The state adjustment of the samples and the standard environment of the test shall be carried out according to the normal deviation range of the standard environment specified in GB 2918, and the time shall be at least 4 hours. Tests are carried out under the same conditions.

(2) Regarding the application method of the mixed solutions, each test sample is placed horizontally on a smooth test bench plane or a flat plate, and the test mixed solution is applied with a brush or a cotton swab. The cotton swab shall be moved horizontally on the test sample in one direction to spread the mixed solution immediately over an area of at least 20 cm². The amount of the applied liquid shall be such that it forms a thin film without accumulation of liquid. A new cotton swab is required to be used for each test.

(3) Regarding determination of the wetting tension, the wetting tension is determined based on the state of the liquid film layer for more than 2 seconds after applying the mixed solution. If the liquid film does not break for more than 2 seconds, a new test sample is re-coated with a mixed solution of the next higher surface tension until the liquid film breaks within 2 seconds. If the liquid film lasts less than 2 seconds, a mixed solution of a lower surface tension is used until the liquid film can last for 2 seconds. The mixed solution that wets the surface of the test sample closest to 2 seconds is used for testing for least 3 times. The wetting tension of the mixed solution is the wetting tension of the test sample.

In one embodiment, an air-pumping experiment, an air-blowing experiment, as well as a wetting tension experiment are performed on the battery, so that the protective patch 30 may be accurately used for testing the airtightness of the battery. Further, under normal conditions, the protective patch 30 at the notch 31 support each other, preventing solid and liquid foreign objects from entering the inside of the protective patch 30 and causing battery safety risks.

In the air-pumping experiment, one cover plate 10 and one explosion-proof valve 20 were selected, and the explosion-proof valve 20 and the cover plate 10 were welded to prefabricate an explosion-proof valve 20 that leaks slightly. The cover plate 10 was tested for airtightness. Protective patches 30 with the same shape and size and with different thicknesses and areas of notches 31 were selected, attached, and sealed on the same explosion-proof valve of the cover plate 10 for pumping test and helium gas detection. After being evacuated by a helium gas detection instrument, helium gas was introduced for detection. If there is leakage of helium gas, it is a qualified product, and if there is no leakage of helium gas, it is an unqualified product. The pumping test can confirm that the protective patch 30 that satisfies 0.5 mm≤a/b≤20 mm, 0.01 mm≤b≤1.2 mm, and 20 N/m≤c≤70 N/m may be accurately used for airtightness testing.

In the air-blowing experiment, protective patches 30 of the same material and size and with notches 31 of different thicknesses and areas were selected and attached to a transparent container to form an airtight environment. By blowing down the protective patches 30, the air pressure difference between the inside and outside was kept at 0.1 atmosphere, and it was observed whether the protective patches 30 at the notches sagged. Sagged protective patches are unqualified product, and the protective patches 30 that do not sag are qualified products. The air-blowing experiment may show that the protective patch 30 provided with the notch 31 has a strong supporting ability, and it is not easy to cause the protective patch 30 to leak and open in the normal use state.

Electrolytes of three different compositions were prepared:
1. ethylene carbonate (60%)+dimethyl carbonate (30%)+LiPF6 (9.5%)+water (0.5%);
2. ethylene carbonate (60%)+diethyl carbonate (30%)+LiPF6 (9%)+H2CO3 (1%); and
3. dimethyl carbonate (60%)+diethyl carbonate (30%)+LiPF6 (9%)+H2CO3 (1%).

Protective patches 30 with the same size, different thicknesses, different notch areas, and different wetting tensions are selected. A drop of the electrolyte is drawn up and placed on the notch with a pipette. The lower part of the protective patch is provided with purple litmus test paper. When the electrolyte drops into the notch, timing is started for 1 minute, the purple litmus test paper is then taken away, and it is observed that if the test paper turns red, it is unqualified, and if the test paper does not turn red, it is qualified.

The above experimental test table may be provided as follows:

| a | b | a/b | c | Results of air-pumping experiment | Results of air-blowing experiment | Electrolyte 1 infiltration experiment | Electrolyte 2 infiltration experiment | Electrolyte 3 infiltration experiment | Is it a qualified product |
|---|---|-----|---|-----|-----|-----|-----|-----|-----|
| 0.05 | 0.005 | 10 | 50 | Qualified | Unqualified | Qualified | Qualified | Qualified | No |
| 0.1 | 0.01 | 10 | 50 | Qualified | Qualified | Qualified | Qualified | Qualified | Yes |
| 1.5 | 0.15 | 10 | 50 | Qualified | Qualified | Qualified | Qualified | Qualified | Yes |
| 5 | 0.5 | 10 | 50 | Qualified | Qualified | Qualified | Qualified | Qualified | Yes |
| 12 | 1.2 | 10 | 50 | Qualified | Qualified | Qualified | Qualified | Qualified | Yes |
| 13 | 1.3 | 10 | 50 | Unqualified | Qualified | Qualified | Qualified | Qualified | No |
| 0.225 | 0.5 | 0.45 | 50 | Unqualified | Qualified | Qualified | Qualified | Qualified | No |
| 0.25 | 0.5 | 0.5 | 50 | Qualified | Qualified | Qualified | Qualified | Qualified | Yes |
| 10 | 0.5 | 20 | 50 | Qualified | Qualified | Qualified | Qualified | Qualified | Yes |
| 10.5 | 0.5 | 21 | 50 | Qualified | Unqualified | Qualified | Qualified | Qualified | No |
| 5 | 0.5 | 10 | 19 | Qualified | Qualified | Unqualified | Unqualified | Unqualified | No |
| 5 | 0.5 | 1 | 20 | Qualified | Qualified | Qualified | Qualified | Qualified | Yes |
| 5 | 0.5 | 10 | 70 | Qualified | Qualified | Qualified | Qualified | Qualified | Yes |
| 5 | 0.5 | 10 | 71 | Unqualified | Qualified | Qualified | Qualified | Qualified | No |

It can be seen from the above table that the protective patch 30 that satisfies 0.5 mm≤a/b≤20 mm, 0.01 mm≤b≤1.2 mm, and 20 N/m≤c≤70 N/m can satisfy the air-pumping experiment, the air-blowing experiment, as well as the wetting tension experiment.

Further, 1 mm≤b≤10 mm.

In some embodiments, the ratio a/b of the area of the cantilever portion 33 to the thickness of the protective patch 30 may be 0.5 mm, 0.6 mm, 1 mm, 1.5 mm, 2 mm, 3 mm, 4 mm, 5 mm, 6 mm, 7 mm, 10 mm, 11 mm, 12 mm, 13 mm, 14 mm, 15 mm, 16 mm, 17 mm, 18 mm, 19 mm, or 20 mm etc.

In some embodiments, 0.04 mm≤b≤0.8 mm, and further, 0.05 mm≤b≤0.3 mm. The thickness b of the protective patch 30 may be 0.05 mm, 0.06 mm, 0.07 mm, 0.075 mm, 0.1 mm, 0.125 mm, 0.188 mm, 0.25 mm, 0.26 mm, 0.3 mm, and so on.

In an embodiment, the battery has a capacity ranging from 50 Ah to 280 Ah. When the internal pressure of the battery reaches a specific value, the explosion-proof valve 20 can be blasted, and the pressure of the battery is thus released. The protective patch 30 may reliably protect the explosion-proof valve 20, and the explosion-proof valve 20 is thus prevented from being damaged under normal use. The capacity of the battery may form a specific relationship with the area of the protective patch 30. For instance, if the capacity of the battery increases, the area of the protective patch 30 may increase accordingly.

In some embodiments, the capacity of the battery may range from 72 Ah to 172 Ah. The capacity of the battery may be 50 Ah, 60 Ah, 70 Ah, 71 Ah, 72 Ah, 75 Ah, 80 Ah, 100 Ah, 120 Ah, 150 Ah, 160 Ah, 161 Ah, 162 Ah, 165 Ah, 168 Ah, 170 Ah, 172 Ah, 180 Ah, 200 Ah, 250 Ah, 280 Ah, etc.

In an embodiment, the battery has an energy density ranging from 120 wh/kg to 300 wh/kg. When the internal pressure of the battery reaches a specific value, the explosion-proof valve 20 can be blasted, so as to achieve reliable pressure relief of the battery. The protective patch 30 may reliably protect the explosion-proof valve 20, and the explosion-proof valve 20 is thus prevented from being damaged under normal use.

The battery may be a lithium iron phosphate battery, and the energy density of the lithium iron phosphate battery may be 120 wh/kg to 190 wh/kg. The energy density of the lithium iron phosphate battery may be 120 wh/kg, 121 wh/kg, 125 wh/kg, 140 wh/kg, 150 wh/kg, 160 wh/kg, 170 wh/kg, 180 wh/kg, 185 wh/kg, 188 wh/kg, 190 wh/kg etc.

The battery may be a ternary system battery, and the energy density of the ternary system battery may be 200 wh/kg to 300 wh/kg. The energy density of the ternary system battery may be: 200 wh/kg, 201 wh/kg, 210 wh/kg, 220 wh/kg, 230 wh/kg, 240 wh/kg, 248 wh/kg, 250 wh/kg, 260 wh/kg, 270 wh/kg, 280 wh/kg, 290 wh/kg, 295 wh/kg, 298 wh/kg, 300 wh/kg, etc.

In some embodiments, the energy density of the ternary system battery may be 190 wh/kg to 200 wh/kg. In some embodiments, it is not excluded that the energy density of the ternary system battery may also be less than 190 wh/kg.

In an embodiment, a ratio of an area enclosed by a circumferential edge of the protective patch 30 to an area enclosed by a circumferential edge of the cover plate 10 is d, where $0.05 \leq d \leq 0.2$. As such, the protective patch 30 can effectively protect the explosion-proof valve 20, and the problem that the area of the protective patch 30 is excessively large can also be avoided.

In one embodiment, $0.1 \leq d \leq 0.15$ not only prevents the protective patch 30 from being excessively large, but also enables the protective patch 30 to achieve reliable protection for the explosion-proof valve 20.

The ratio d of the area enclosed by the circumferential edge of the protective patch 30 to the area enclosed by the circumferential edge of the cover plate 10 may be 0.1, 0.11, 0.12, 0.13, 0.14, 0.15, etc.

In an embodiment, the area enclosed by the circumferential edge of the protective patch is e, where $800 \text{ mm}^2 \leq e \leq 950 \text{ mm}^2$. Further, $850 \text{ mm}^2 \leq e \leq 900 \text{ mm}^2$, so that the protective patch 30 can have a sufficient protection area, and the area of the protective patch 30 may not be excessively large, and that the use performance of the protective patch 30 may be improved.

The area e enclosed by the circumferential edge of the protective patch 30 may be 850 mm$^2$, 855 mm$^2$, 860 mm$^2$, 870 mm$^2$, 880 mm$^2$, 890 mm$^2$, 895 mm$^2$, 896 mm$^2$, 898 mm$^2$, 900 mm$^2$, etc.

In an embodiment, the protective patch 30 may be configured to be connected to an evacuation device, such that when a vacuum degree of a space where the protective patch 30 is located is g, an opening area of the notch 31 is f, where $1 \times 10^{-2} \text{ Pa} \leq g \leq 4.5 \times 10^{-2} \text{ Pa}$ and $0.8 \text{ mm}^2 \leq f \leq 2 \text{ mm}^2$. Further, $2 \times 10{-2} \text{ Pa} \leq g \leq 3 \times 10^{-2} \text{ Pa}$ and $1.2 \text{ mm}^2 \leq f \leq 1.7 \text{ mm}^2$, such that when the airtightness of the battery is tested, the evacuation device can reliably open the notch 31, and that the chamber 111 is released, so as to prevent the problem that the protective patch 30 is damaged due to an excessively large opening area of the notch 31. The evacuation device may be a vacuum pump.

The vacuum degree g of the space where the protective patch 30 is located may be $2 \times 10^{-2}$ Pa, $2.1 \times 10^{-2}$ Pa, $2.2 \times 10^{-2}$ Pa, $2.3 \times 10^{-2}$ Pa, $2.5 \times 10^{-2}$ Pa, $2.6 \times 10^{-2}$ Pa, $2.8 \times 10^{-2}$ Pa, $2.9 \times 10^{-2}$ Pa, $3 \times 10^{-2}$ Pa, etc.

The opening area f of the notch 31 may be 1.2 mm$^2$, 1.3 mm$^2$, 1.4 mm$^2$, 1.472 mm$^2$, 1.5 mm$^2$, 1.6 mm$^2$, 1.65 mm$^2$, 1.68 mm$^2$, 1.7 mm$^2$, etc.

Figure 2:
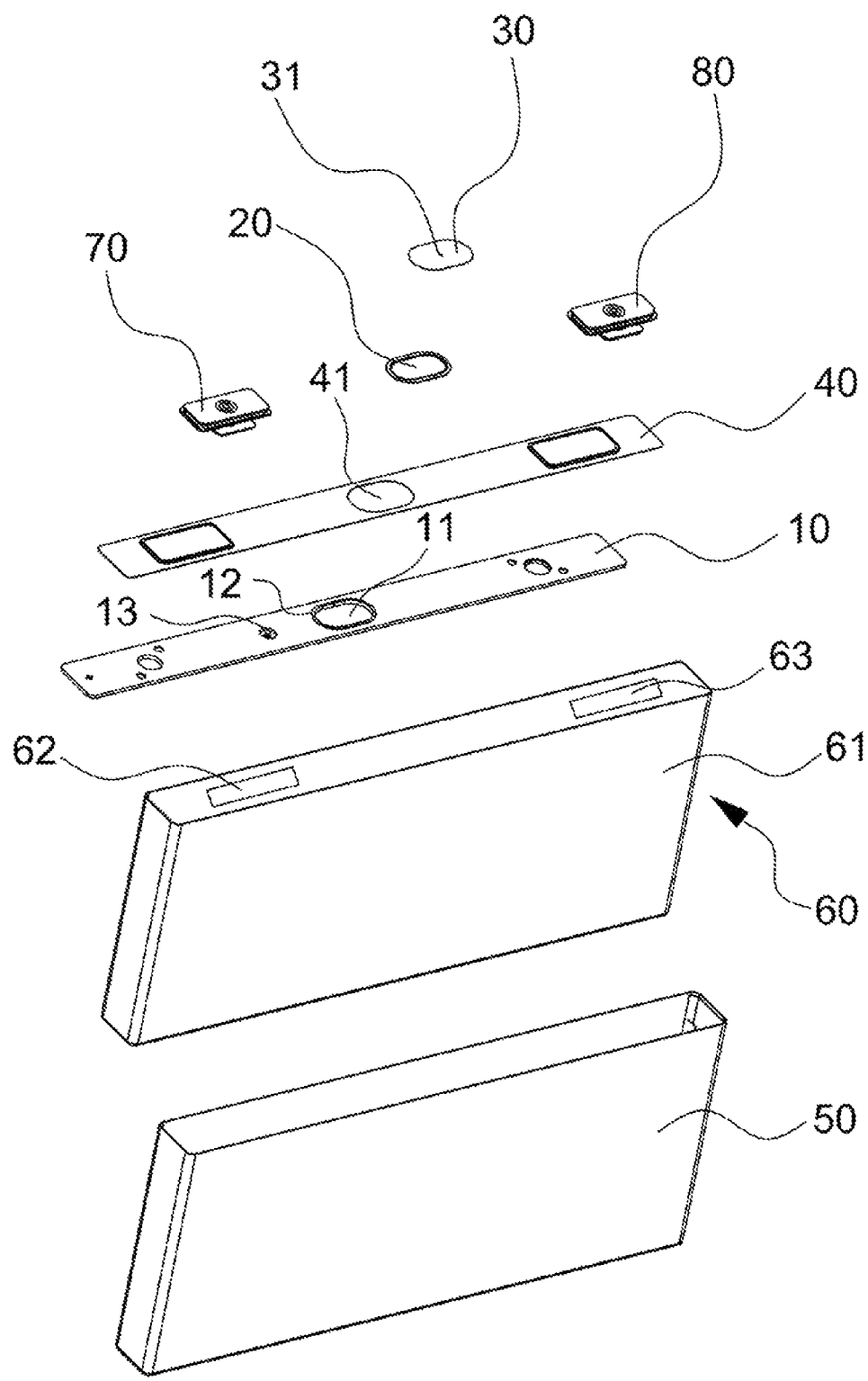
FIG. 2 is an exploded schematic view of the battery according to an exemplary embodiment.
Figure 3:
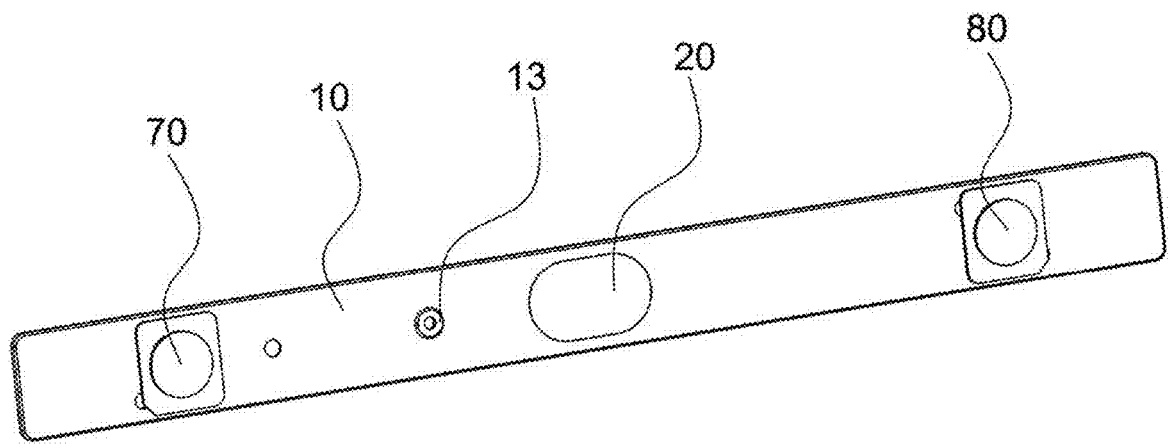
FIG. 3 is a schematic view of a portion of the battery according to an exemplary embodiment.
Figure 5:
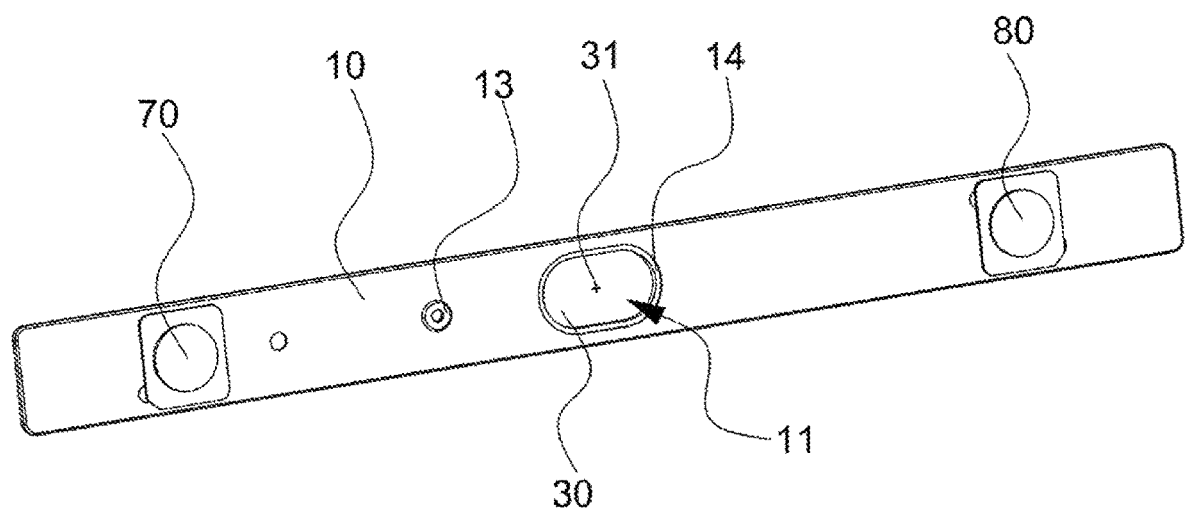
FIG. 5 is a schematic view of another portion of the battery according to an exemplary embodiment.

In an embodiment, as shown in FIG. 2, FIG. 3, and FIG. 5, a liquid injection hole 13 is arranged on the cover plate 10, and a minimum distance between the liquid injection hole 13 and the protective patch 30 is not less than 5 mm. The electrolyte may be injected through the liquid injection hole 13, and the electrolyte may be prevented from flowing to the position of the protective patch 30 during the liquid injection process, so as to ensure the service life of the protective patch 30 and the explosion-proof valve 20.

In some embodiments, the distance between the liquid injection hole 13 and the protective patch 30 is 10 mm-25 mm, and in this way, a sufficient safety distance is provided between the liquid injection hole 13 and the protective patch 30, and the liquid injection hole 13 and the protective patch 30 may both be reasonably arranged.

The distance between the liquid injection hole 13 and the protective patch 30 may be 10 mm, 11 mm, 12 mm, 15 mm, 16 mm, 17 mm, 18 mm, 19 mm, 22 mm, 23 mm, 24 mm, 25 mm, etc.

It should be noted that, after the electrolyte is injected through the liquid injection hole 13, the liquid injection hole 13 may be reliably sealed by a sealing nail.

In an embodiment, the protective patch 30 may be configured to be connected to an evacuation device, such that when a vacuum degree of a space where the protective patch 30 is located is g, an open angle of the cantilever portion 33 is h, where $1 \times 10^{-2} \text{ Pa} \leq g \leq 4.5 \times 10^{-2} \text{ Pa}$ and $5° \leq h \leq 50°$. Further, $2 \times 10^{-2} \text{ Pa} \leq g \leq 3 \times 10^{-2} \text{ Pa}$ and $15° \leq h \leq 45°$, so that when the airtightness of the battery is tested, the evacuation device can reliably open the notch 31, such that the chamber 111 is released, and the problem that the protective patch 30 is damaged due to an excessively large opening area of the notch 31 is also prevented from occurring. The evacuation device may be a vacuum pump.

The vacuum degree g of the space where the protective patch 30 is located may be $2 \times 10^{-2}$ Pa, $2.1 \times 10^{-2}$ Pa, $2.2 \times 10^{-2}$ Pa, $2.3 \times 10^{-2}$ Pa, $2.5 \times 10^{-2}$ Pa, $2.6 \times 10^{-2}$ Pa, $2.8 \times 10^{-2}$ Pa, $2.9 \times 10^{-2}$ Pa, $3 \times 10.2$ Pa, etc.

The open angle h of the cantilever portion 33 may be 5°, 6°, 8°, 10°, 12°, 13°, 15°, 16°, 18°, 20°, 22°, 23°, 25°, 30°, 31°, 32°, 33°, 35°, 36°, 38°, 40°, 42°, 43°, 45°, 46°, 48°, 49°, or 50° etc.

In an embodiment, the notch 31 is located at the center of the protective patch 30, so that the protective patch 30 can reliably protect the explosion-proof valve 20, and the notch 31 can also be reliably used to test the airtightness of the battery.

In an embodiment, the notch 31 includes a first notch segment 311 and a second notch segment 312, and the first notch segment 311 intersects with the second notch segment 312. As such, when the battery is tested for airtightness, the evacuation device may reliably open the first notch segment 311 and the second notch segment 312, thereby realizing the release of the chamber 111. The first notch segment 311 intersects with the second notch segment 312 to form the at least one cantilever portion 33.

In an embodiment, the first notch segment 311 is perpendicular to the second notch segment 312, so as to ensure that the first notch segment 311 and the second notch segment 312 may be opened under a predetermined pressure. Further, after the pressure is released, the first notch segment 311 and the second notch segment 312 may be restored to the original state, that is, the first notch segment 311 and the second notch segment 312 enclose the chamber 111.

Figure 6:
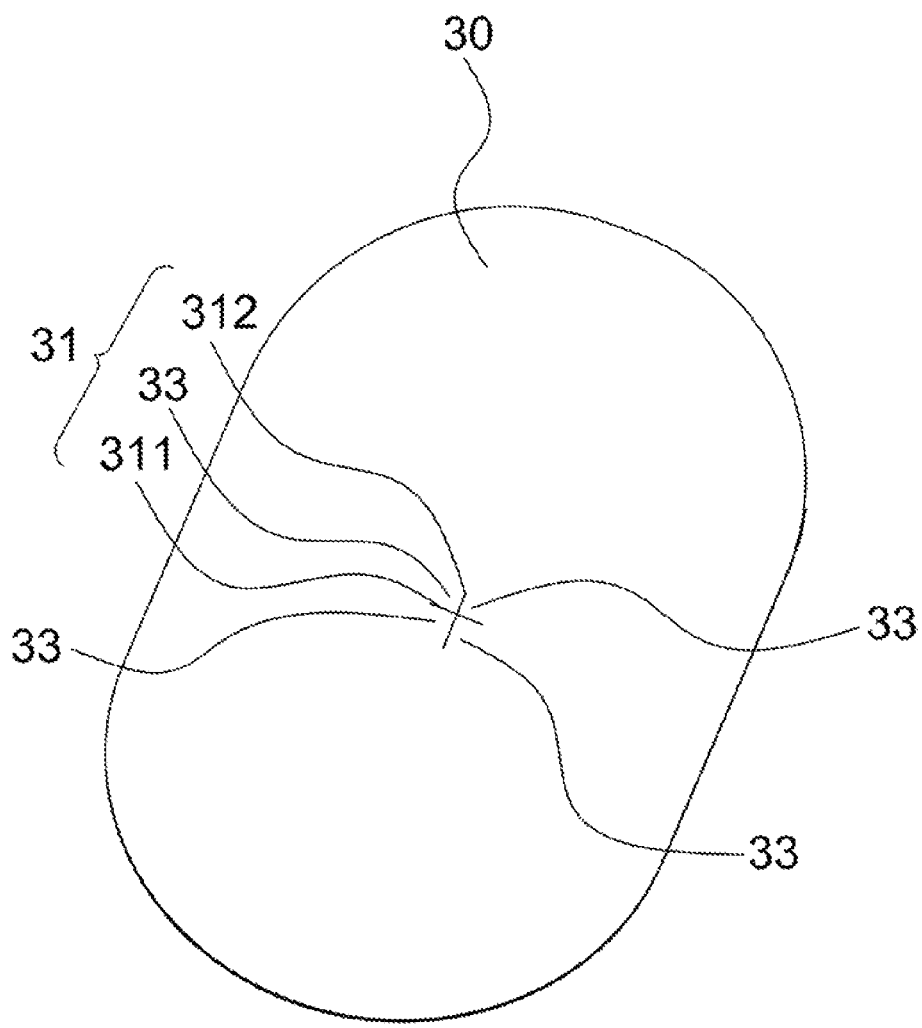
FIG. 6 is a schematic view of a protective patch of the battery according to a first exemplary embodiment.

In an embodiment, as shown in FIG. 6, a middle portion of the first notch segment 311 intersects with a middle portion of the second notch segment 312, so as to further ensure that the first notch segment 311 and the second notch segment 312 may be opened under a predetermined pressure. Further, after the pressure is released, the first notch segment 311 and the second notch segment 312 may be restored to the original state, that is, the first notch segment 311 and the second notch segment 312 enclose the chamber 111. A middle portion of the first notch segment 311 intersects with a middle portion of the second notch segment 312 to form a plurality of cantilever portions 33.

The notch 31 formed by the first notch segment 311 and the second notch segment 312 may be cross-shaped, so as to form four cantilever portions 33.

In an embodiment, a length of the first notch segment 311 and a length of the second notch segment 312 are consistent, and in this way, the manufacturing process is simple, and it may be ensured that the first notch segment 311 and the second notch segment 312 may be opened synchronously when the battery is tested for airtightness. The length of the first notch segment 311 and the second notch segment 312 may both be 2 mm.

In some embodiments, it is not excluded that the length of the first notch segment 311 and the length of the second notch segment 312 are inconsistent.

Figure 7:
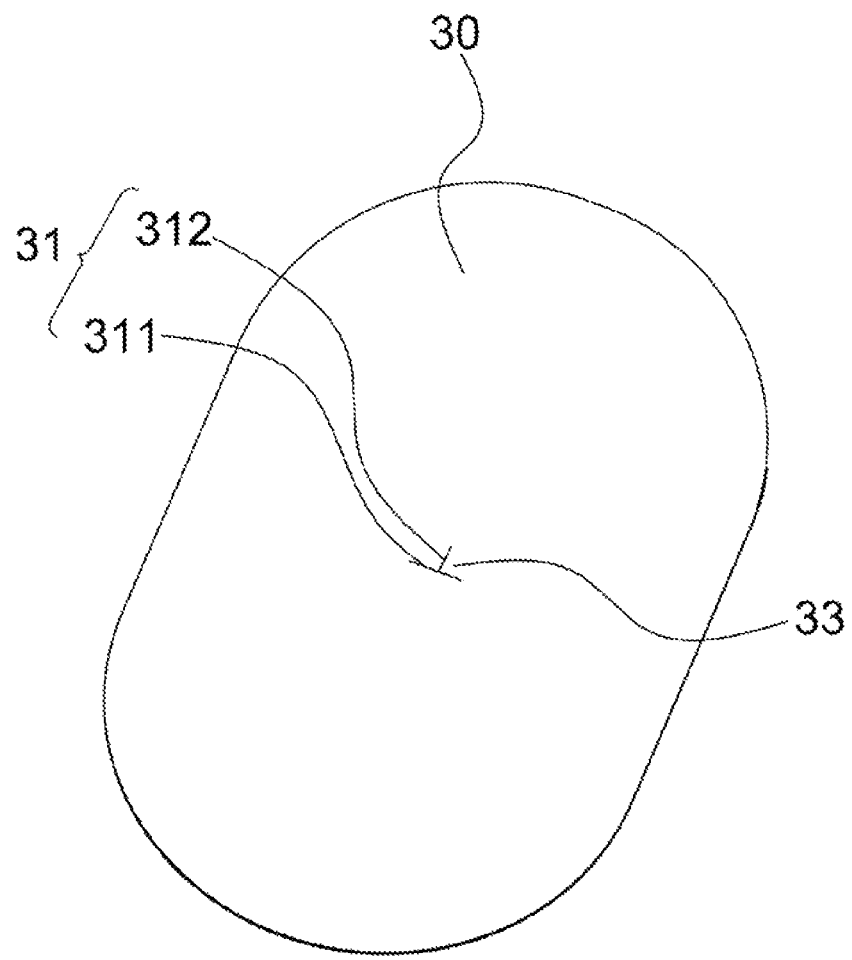
FIG. 7 is a schematic view of the protective patch of the battery according to a second exemplary embodiment.

In some embodiments, as shown in FIG. 7, the notch 31 formed by the first notch segment 311 and the second notch segment 312 may be T-shaped, so as to form 2 cantilever portions 33.

Figure 8:
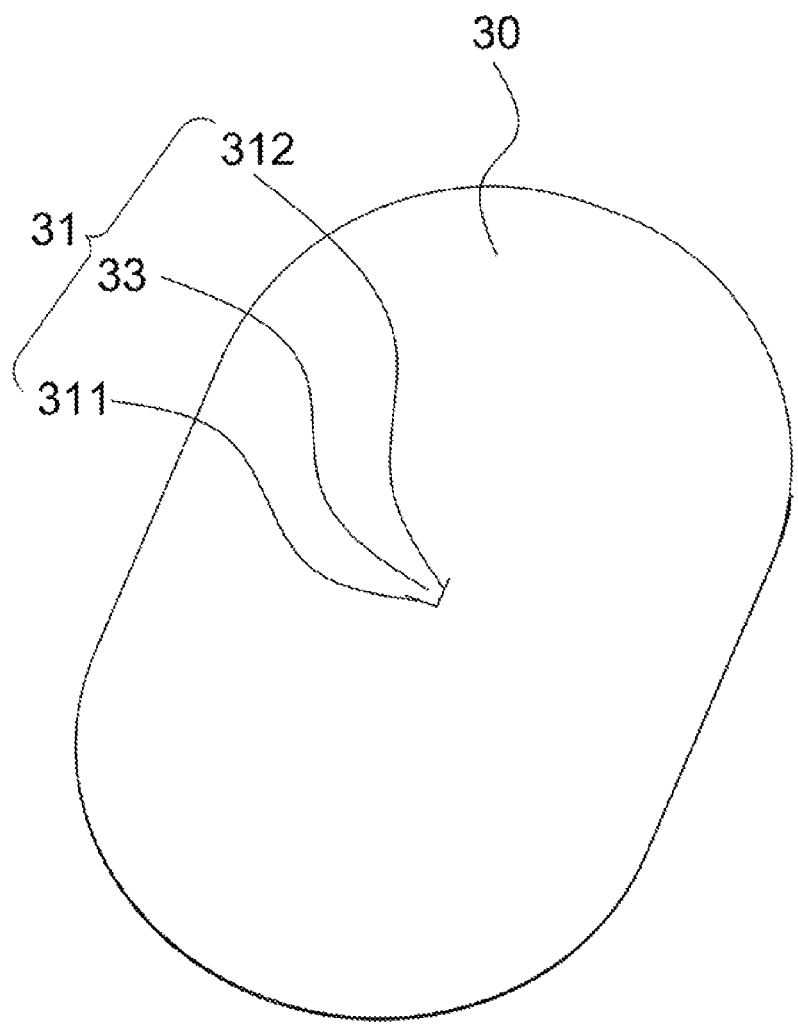
FIG. 8 is a schematic view of the protective patch of the battery according to a third exemplary embodiment.

In some embodiments, as shown in FIG. 8, the notch 31 formed by the first notch segment 311 and the second notch segment 312 may be L-shaped, so as to form 1 cantilever portion 33.

Figure 9:
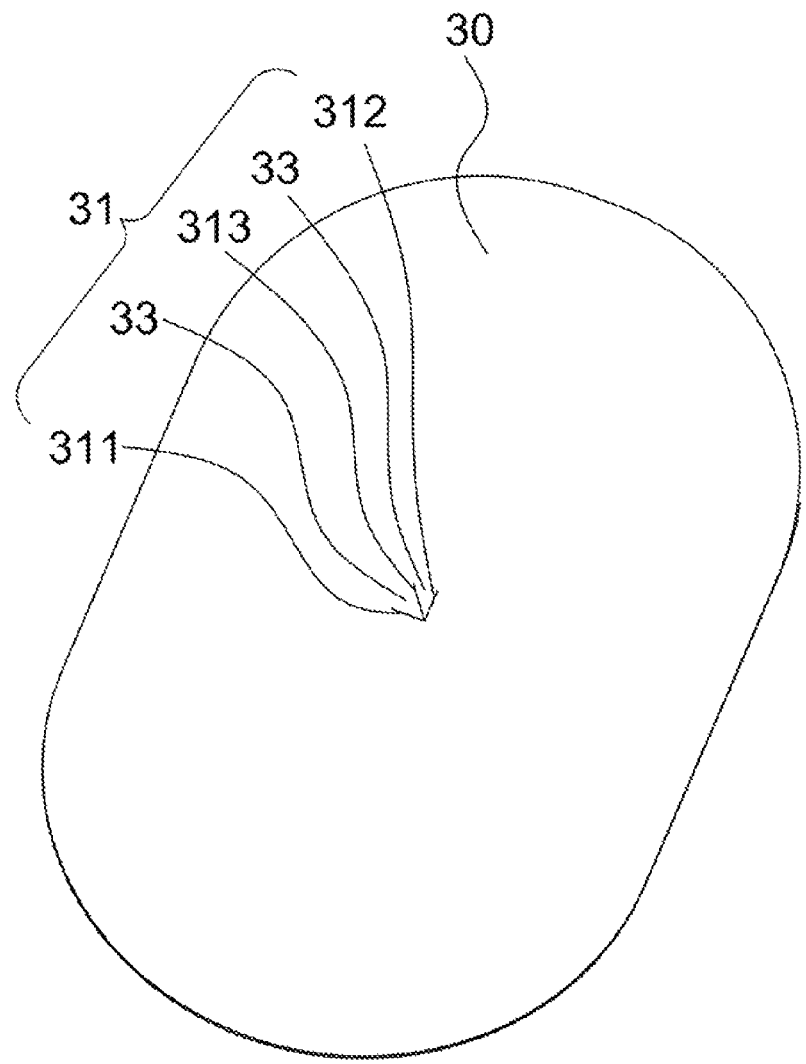
FIG. 9 is a schematic view of the protective patch of the battery according to a fourth exemplary embodiment.

In some embodiments, as shown in FIG. 9, the notch 31 may further include a third notch segment 313, and the first notch segment 311, the second notch segment 312, and the third notch segment 313 may form a Y-shaped, so as to form 2 cantilever portions 33.

It is noted that the first notch segment 311 intersects with the second notch segment 312, that is, the at least one cantilever portion 33 is formed on the protective patch 30 through the first notch segment 311 and the second notch segment 312. When testing the airtightness of the battery, the notch 31 is used to achieve the communication between the chamber 111 and the outside. In the actual test process, when the pressure reaches a certain value, the cantilever portion 33 is deformed and folded upwards, that is, the cantilever portion 33 is opened, so that the sealed chamber 111 may communicate with the outside through the notch 31.

Figure 10:
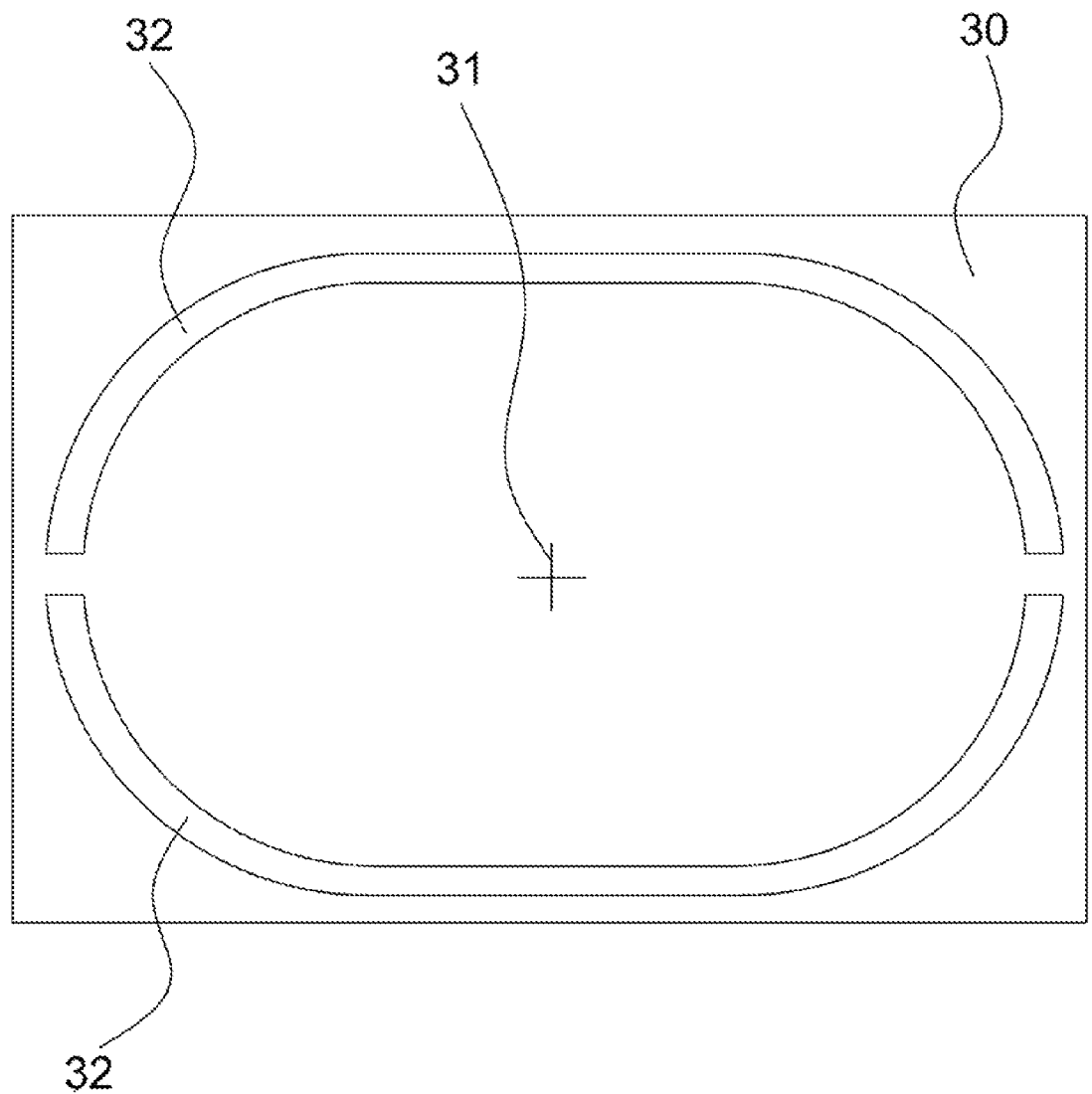
FIG. 10 is a schematic view of the protective patch of the battery according to a fifth exemplary embodiment.

In an embodiment, as shown in FIG. 10, an identification portion 32 is arranged on the protective patch 30, so that whether the battery is provided with the protective patch 30 may be determined through the identification portion 32, and the problem of absence of the protective patch 30 is thereby avoided.

The identification portion 32 may be a structural identification portion, for example, the structural identification portion may be a protruding structure, or the structural identification portion may be a stripe with graphics or the like. The identification portion 32 may also be a color identification portion, for example, the protective patch 30 is coated with an easily visible color, for example, red, green, blue or yellow, and the like.

In an embodiment, the protective patch 30 and the cover plate 10 are connected to each other through an adhesive portion, and at least a portion of the adhesive portion is the identification portion 32. Herein, the protective patch 30 is a transparent member 30, and the color of the adhesive portion is not consistent with the color of the protective patch 30, such that the adhesive portion is revealed through the protective patch 30, and that an operator may judge whether the battery is provided with the protective patch 30 by the color of the adhesive portion.

It is noted that the protective patch 30 is a transparent member 30, and the color of the adhesive portion may be red, green, blue, yellow, or the like. In this way, the color of the adhesive portion may be seen through the protective patch 30, so that an operator can judge whether the battery is provided with the protective patch 30 by the color of the adhesive portion.

A circle of colored adhesive portion may be arranged on the protective patch 30, so that the protective patch 30 may be adhered through this adhesive portion. The colored adhesive portion may be formed by mixing pigments, which is not limited herein.

In an embodiment, the adhesive portion includes a first adhesive portion and a second adhesive portion. The first adhesive portion is the identification portion 32, and the first adhesive portion covers a portion of the protective patch 30. One portion of the second adhesive portion covers the first adhesive portion, and another portion of the second adhesive portion covers the protective patch 30, so that the second adhesive portion is adhered to the cover plate 10. In this way, it can be ensured that the protective patch 30 is reliably arranged on the cover plate 10, and an operator may judge whether the battery is provided with the protective patch 30 by the color of the first adhesive portion.

As shown in FIG. 10, at least two first adhesive portions may be provided, and the first adhesive portions are arranged at intervals, so that the protective patch 30 between the two adjacent first adhesive portions is exposed, and the exposed protective patch 30 may be provided with the second adhesive portion.

In one embodiment, as shown in FIG. 11, the notch 31 may be a curve so as to form one cantilever portion 33. The curve may be an arc.

In an embodiment, as shown in FIG. 2, a reinforcement ring 12 is arranged on the cover plate 10, and the reinforcement ring 12 is arranged on an outer surface of the cover plate and surrounds the explosion-proof hole 11. The protective patch 30 is arranged on a surface of the reinforcement ring 12 facing away from the cover plate 10. Therefore, the protective patch 30 may be conveniently arranged on the reinforcement ring 12, and the reinforcement ring 12 may reliably strengthen the cover plate 10 to ensure the structural strength of the cover plate and prevent the cover plate 10 from fracturing.

In an embodiment, as shown in FIG. 1 and FIG. 2, the battery pack further includes an insulating top cover 40. The insulating top cover 40 is arranged on the outer surface of the cover plate 10, and a through hole 41 opposite to the explosion-proof hole 11 is arranged on the insulating top cover 40. Herein, an upper surface of the insulating top cover 40 is flush with an upper surface of the protective patch 30. The insulating top cover 40 may provide reliable insulating performance, and as the protective patch 30 may reliably protect the explosion-proof valve 20, it can also ensure that the top of the battery is relatively flat.

It is noted that the insulating top cover 40 covers the outer surface of the cover plate 10, and as the insulating top cover 40 may reliably protect the cover plate 10, problems such as electrical connection may be avoided, and the safety performance of the battery is thereby ensured.

In an embodiment, the reinforcement ring 12 is arranged on the cover plate 10, and the reinforcement ring 12 is arranged on the outer surface of the cover plate 10 and surrounds the explosion-proof hole 11. The reinforcement ring 12 is located in the through hole 41, so that the protective patch 30 may be conveniently arranged on the reinforcement ring 12.

In an embodiment, a gap is provided between the reinforcement ring 12 and a hole wall of the through hole 41, so that the insulating top cover 40 may be conveniently installed on the cover plate 10, and problems such as interference between the insulating top cover 40 and the reinforcement ring 12 are prevented from occurring.

It is noted that the installation of the insulating top cover 40 may be performed after the protective patch 30 is arranged on the reinforcement ring 12, so a gap is provided between the reinforcement ring 12 and the hole wall of the through hole 41. Further, the gap between the protective patch 30 and the hole wall of the through hole 41 may avoid interference between the insulating top cover 40 and the reinforcement ring 12 or the protective patch 30.

In an embodiment, the battery pack further includes the insulating top cover 40. The insulating top cover 40 is arranged on the outer surface of the cover plate 10, and the through hole 41 opposite to the explosion-proof hole 11 is arranged on the insulating top cover 40. Herein, the protective patch 30 covers a portion of the insulating top cover 40, so that the connection surface of the protective patch 30 can be larger, the connection stability of the protective patch 30 is improved, and the protection of the insulating top cover 40 can be achieved by the protective patch 30.

In an embodiment, at least part of the explosion-proof valve 20 is located in the explosion-proof hole 11, so that the installation reliability of the explosion-proof valve 20 is ensured, and the explosion-proof valve 20 may be protected.

In an embodiment, as shown in FIG. 3 to FIG. 5, an installation groove 14 is arranged on an inner surface of the cover plate 10, and the installation groove 14 surrounds the explosion-proof hole 11. The explosion-proof valve 20 is connected to a groove wall of the installation groove 14, so as to reliably connect the explosion-proof valve 20 to the cover plate 10.

The circumferential outer edge of the explosion-proof valve 20 may reliably contact a side wall of the installation groove 14, so that the explosion-proof valve 20 is positioned, and it can be ensured that the explosion-proof valve 20 may be reliably fixed in the installation groove 14.

In an embodiment, as shown in FIG. 1 and FIG. 2, the battery further includes a shell 50, a cell 60, a first terminal component 70, and a second terminal component 80. The cover plate 10 is connected to the shell 50. The cell 60 is arranged in the cover plate 10 and the shell 50, and the cell 60 includes a cell body 61, a first tab 62, and a second tab 63. The first terminal component 70 is arranged on the cover plate 10 and is connected to the first tab 62. The second terminal component 80 is arranged on the cover plate 10 and is connected to the second tab 63. Herein, the explosion-proof hole 11 is located between the first terminal component 70 and the second terminal component 80. That is, the protective patch 30 is located between the first terminal component 70 and the second terminal component 80, so that various components may be reasonably distributed on the cover plate 10.

The battery includes the cell and an electrolyte, and the battery is the smallest unit capable of performing electrochemical reactions such as charging/discharging. The cell refers to a unit formed by winding or laminating a stacked part, and the stacked part includes a first electrode, a separator, and a second electrode. When the first electrode is a positive electrode, the second electrode is a negative electrode. The polarities of the first electrode and the second electrode may be interchanged.

The first tab 62 may be directly connected to the first terminal component 70. For instance, the first tab 62 and the first terminal component 70 may be directly welded, or the first tab 62 and the first terminal component 70 may be connected through a transition piece. The second tab 63 may be directly connected to the second terminal component 80. For instance, the second tab 63 and the second terminal component 80 may be directly welded, or the second tab 63 and the second terminal component 80 may be connected through a transition piece.

In some embodiments, the first tab 62 and the second tab 63 extend from opposite ends of the cell body 61.

In some embodiments, as shown in FIG. 2, the first tab 62 and the second tab 63 extend from one end of the cell body 61 towards the cover plate 10. In this way, the first tab 62 and the second tab 63 may be conveniently connected to the first terminal component 70 and the second terminal component 80 subsequently.

In an embodiment, the protective patch 30 may be may be at least one of polyethylene terephthalate (PET), a polytrimethylene terephthalate (abbreviated as PTT) layer, a polypropylene (abbreviated as PP) layer, and a polycarbonate (abbreviated as PC) layer, which is not limited herein.

In one embodiment, the battery is a square battery.

An embodiment of the disclosure further provides a battery apparatus including the abovementioned battery.

The battery apparatus provided by an embodiment of the disclosure includes the battery, and the battery includes the cover plate 10, the explosion-proof valve 20, and the protective patch 30. The explosion-proof hole 11 is arranged on the cover plate 10, the explosion-proof valve 20 is arranged on the cover plate 10 and shields the explosion-proof hole 11. By arranging the protective patch 30 on the outer side of the cover plate 10 and shielding the explosion-proof hole 11, the protective patch 30 can safeguard the explosion-proof valve 20 to protect the explosion-proof valve 20, and the life and safety of the explosion-proof valve 20 is thereby improved. The notch 31 is arranged on the protective patch 30. In this way, the notch 31 is in a closed state under normal conditions, that is, the chamber 111 is a sealed chamber. When the battery is tested for airtightness, the cantilever portion 33 formed by the notch 31 can be in the opened state when a predetermined pressure is applied, such that the chamber 111 is an unsealed chamber. Through the arrangement of the notch 31, the explosion-proof valve 20 is effectively protected under normal use. The notch 31 may further be used for the airtightness testing of the battery to accordingly improve the performance of the battery apparatus.

In an embodiment, the battery apparatus is a battery module or a battery pack.

The battery module includes a plurality of batteries, and the battery module may further include end plates, and side plates. The end plates and the side plates are configured to secure the batteries.

The battery apparatus also includes a battery box, and the battery is arranged in the battery box. A plurality of batteries may be formed into a battery module and then arranged in the battery box, and the plurality of batteries may be secured by the end plates and the side plates. The plurality of batteries may be directly disposed in the battery box, that is, the plurality of batteries are not required to be arranged into groups, and the end plates and the side plates may be removed at this time.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising:
   a cover plate, wherein an explosion-proof hole is arranged on the cover plate;
   an explosion-proof valve, wherein the explosion-proof valve is arranged on the cover plate to shield the explosion-proof hole; and
   a protective patch, wherein the protective patch is located on an outer side of the cover plate and shields the explosion-proof hole, a chamber is formed between the explosion-proof valve and the protective patch, and a notch penetrating through the protective patch is arranged on the protective patch in a thickness direction to form at least one cantilever portion, the notch is convertible between a closed state under normal conditions and an opened state when a predetermined pressure is applied, when the notch is in the closed state, the chamber is a sealed chamber, and when the predetermined pressure is applied, the cantilever portion formed by the notch is in the opened state, and the chamber is an unsealed chamber and communicates with an outside through the cantilever portion that is opened,
   wherein the cantilever portion comprises a first end point and a second end point, at least a portion of the notch continues from the first end point to the second end point, the at least a portion of the notch is not in a straight line, the cantilever portion has an area of a $mm^2$, the area of the cantilever portion is the area jointly enclosed by a connecting line between the first end point and the second end point and the notch between the first end point and the second end point, the protective patch has a thickness of b mm, where 0.5 mm≤a/b≤20 mm and 0.01 mm≤b≤1.2 mm, the protective patch has a wetting tension of c, where 20 N/m≤c≤70 N/m, and a wetting tension test method applied to the protective patch is: GB/T 14216-1993.

2. The battery according to claim 1, wherein the protective patch is configured to be connected to an evacuation device, such that when a vacuum degree of a space where the protective patch is located is g, an opening area of the notch is f, where $1\times10^{-2}$ Pa≤g≤$4.5\times10^{-2}$ Pa and 0.8 $mm^2$≤f≤2 $mm^2$.

3. The battery according to claim 1, wherein the protective patch is configured to be connected to an evacuation device, such that when a vacuum degree of a space where the protective patch is located is g, an open angle of the at least one cantilever portion is h, where $1\times10^{-2}$ Pa≤g≤$4.5\times10^{-2}$ Pa and 5°≤h≤50°.

4. The battery according to claim 1, wherein the notch is located in a center of the protective patch, and the notch comprises a first notch segment and a second notch segment,
   wherein the first notch segment intersects with the second notch segment to form the at least one cantilever portion, and/or a middle portion of the first notch segment intersects with a middle portion of the second notch segment to form a plurality of the cantilever portions.

5. The battery according to claim 4, wherein the first notch segment is perpendicular to the second notch segment, and/or a length of the first notch segment and a length of the second notch segment are consistent.

6. The battery according to claim 1, wherein an identification portion is arranged on the protective patch, the protective patch and the cover plate are connected to each other through an adhesive portion, and at least a portion of the adhesive portion is the identification portion,
   wherein the protective patch is a transparent member, and a color of the adhesive portion is not consistent with a color of the protective patch, such that the adhesive portion is revealed through the protective patch.

7. The battery according to claim 1, wherein a ratio of an area enclosed by a circumferential edge of the protective patch to an area enclosed by a circumferential edge of the cover plate is d, where 0.05≤d≤0.2.

8. The battery according to claim 7, wherein the area enclosed by the circumferential edge of the protective patch is e, where 800 $mm^2$≤e≤950 $mm^2$.

9. The battery according to claim 7, wherein the battery has a capacity ranging from 50 Ah to 280 Ah, or the battery has an energy density ranging from 120 wh/kg to 300 wh/kg.

10. The battery according to claim 1, wherein a liquid injection hole is arranged on the cover plate, and a minimum distance between the liquid injection hole and the protective patch is not less than 5 mm.

11. The battery according to claim 10, wherein a distance between the liquid injection hole and the protective patch is 10 mm to 25 mm.

12. The battery according to claim 1, wherein a reinforcement ring is arranged on the cover plate, the reinforcement ring is arranged on an outer surface of the cover plate and surrounds the explosion-proof hole, the protective patch is arranged on a surface of the reinforcement ring facing away from the cover plate, and a hole wall of the explosion-proof hole, the explosion-proof valve, and the protective patch together enclose the chamber.

13. The battery according to claim 1, further comprising:
an insulating top cover, wherein the insulating top cover is arranged on an outer surface of the cover plate, and a through hole opposite to the explosion-proof hole is arranged on the insulating top cover,
wherein an upper surface of the insulating top cover is flush with an upper surface of the protective patch.

14. The battery according to claim 13, wherein a reinforcement ring is arranged on the cover plate, the reinforcement ring is arranged on the outer surface of the cover plate and surrounds the explosion-proof hole, and the reinforcement ring is located in the through hole.

15. The battery according to claim 14, wherein a gap is provided between the reinforcement ring and a hole wall of the through hole.

16. The battery according to claim 1, further comprising:
an insulating top cover, wherein the insulating top cover is arranged on an outer surface of the cover plate, and a through hole opposite to the explosion-proof hole is arranged on the insulating top cover,
wherein the protective patch covers a portion of the insulating top cover.

17. The battery according to claim 1, further comprising:
a shell, wherein the cover plate and the shell are connected to each other;
a cell, wherein the cell is arranged in the cover plate and the shell, and the cell comprises a cell body, a first tab, and a second tab,
a first terminal component, wherein the first terminal component is arranged on the cover plate and is connected to the first tab; and
a second terminal component, wherein the second terminal component is arranged on the cover plate and is connected to the second tab;
wherein the explosion-proof hole is located between the first terminal component and the second terminal component.

18. A battery apparatus, comprising the battery according to claim 1.

* * * * *